United States Patent
Yeh et al.

(10) Patent No.: US 10,228,800 B2
(45) Date of Patent: *Mar. 12, 2019

(54) METHOD AND DEVICE FOR POSITION DETECTION

(71) Applicant: EGALAX_EMPIA TECHNOLOGY INC., Taipei (TW)

(72) Inventors: Shang-Tai Yeh, Taipei (TW); Teng-Wei Hsieh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/582,447

(22) Filed: Dec. 24, 2014

(65) Prior Publication Data

US 2015/0116277 A1    Apr. 30, 2015

Related U.S. Application Data

(63) Continuation of application No. 13/437,090, filed on Apr. 2, 2012, now Pat. No. 8,952,936.

(51) Int. Cl.
*G06F 3/041* (2006.01)
*G06F 3/043* (2006.01)

(52) U.S. Cl.
CPC ............ *G06F 3/043* (2013.01); *G06F 3/0418* (2013.01); *G06F 3/0436* (2013.01)

(58) Field of Classification Search
CPC ...... G06F 3/0436; G06F 3/016; G06F 3/0416; G06F 3/043; G06F 3/044; B06B 1/0246; H01L 41/09
See application file for complete search history.

(56) References Cited

U.S. PATENT DOCUMENTS

| 4,825,212 | A | * | 4/1989 | Adler | .................... | G06F 3/0436 310/313 A |
| 2007/0109280 | A1 | | 5/2007 | Sigona | | |
| 2008/0062151 | A1 | * | 3/2008 | Kent | .................... | G06F 3/0436 345/177 |
| 2010/0134735 | A1 | * | 6/2010 | Nakamura | .......... | H01L 31/1055 349/116 |
| 2011/0298482 | A1 | * | 12/2011 | Tokudome | ........... | H03K 17/962 324/686 |

* cited by examiner

*Primary Examiner* — Insa Sadio
(74) *Attorney, Agent, or Firm* — WPAT, PC

(57) ABSTRACT

The present invention provides a method and device for position detection. For detection of a touch position, a segment of surface acoustic wave (SAW) is provided multiple times to be propagated on a SAW touch panel, and the multiple SAW segments are received by the SAW touch panel. In addition, during or after reception, partial output electrical signals are provided based on different portions of each received SAW segment to construct a complete output electrical signal.

17 Claims, 6 Drawing Sheets

METHOD AND DEVICE FOR POSITION DETECTION

CROSS REFERENCE TO RELATED APPLICATIONS

This application is a continuation of U.S. patent application Ser. No. 13/437,090, filed on Apr. 2, 2012.

BACKGROUND OF THE INVENTION

1. Field of the Invention

The present invention relates to a method and device for touch position detection, and more particularly, to a method and device for touch position detection on large-size surface acoustic wave panel.

2. Description of the Prior Art

Surface acoustic wave (SAW) touch panel is a touch panel that determines the position of a touch input on a touch screen by sensing a SAW signal at a target location. It converts an electrical signal to the SAW signal by using a transducer including a piezoelectric material, and then determines whether the SAW signal is blocked and cannot be received when traveling on the touch screen.

FIG. 1A is a schematic diagram illustrating the structure of a conventional SAW touch panel. As shown in FIG. 1A, a touch panel 10 includes a screen area 11 and a reflection area 12. The reflection area 12 includes a sensing device 13, which has a first and a second horizontal-axis transducer element 14a and 14b and a first and a second vertical-axis transducer element 15a and 15b, wherein the second horizontal-axis and vertical axis transducer elements 14b and 15b receive SAW signals Signal_V1 and Signal_V2 corresponding to input electrical signals Signal_Ei1 and Signal_Ei2 sent by the first horizontal-axis and vertical axis transducer elements 14a and 15a, respectively. In addition, the sensing device 13 further includes a set of first and second vertical-axis reflection units 16a and 16b and a set of first and second horizontal-axis reflection units 17a and 17b. These four reflection units 16a, 16b, 17a and 17b each includes a plurality of reflectors r. These reflectors r are all partially transmissive and partially reflective. Meanwhile, the SAW signals Signal_V1 and Signal_V2 necessary for sensing a possible touch point P input on each horizontal axis and vertical axis are provided by this partially transmissive and partially reflective effect of the reflectors r. These reflectors r can be a wiring layer printed on a glass substrate of the touch screen, so cost of manufacturing is low. In addition, the reflectors r of the reflection units 16a, 16b, 17a and 17b are all arranged from sparse to dense (as seen from the traveling directions of the SAW signals Signal_V1 and Signal_V2). The reason for this is because that, in the case of evenly arranged reflection units 16a, 16b, 17a and 17b, the SAW signals Signal_V1 and Signal_V2 available for reflection for reflectors r at the back are less due to partial reflection. This affects the ability of the reflection units 16a, 16b, 17a and 17b to accurately sense the positions of input touch points corresponding to the back parts thereof. Thus, the reflection units 16a, 16b, 17a and 17b are arranged from sparse to dense to even the SAW signal Signal_V1 or Signal_V2 input to each reflector r for compensation. FIGS. 1B and 1C are diagrams illustrating electric potentials of output electrical signals Signal_Eo1 and Signal Eo2 of the SAW touch panel shown in FIG. 1A without and with a touch point P input, respectively. In the diagrams, Vy represents the electrical potential of the output electrical signal Signal_Eo1, and is the X axis of the coordinate of the input touch point P; Vx represents the electrical potential of the output electrical signal Signal_Eo2, and is the Y axis of the coordinate of the input touch point P. The reason that the duration of Vx is longer than that of Vy is because the path traveled by the second SAW signal Signal_V2 is longer. The depression shown in FIG. 1C is a representation of the sensing of the touch point P, which is the basis for determining the position of the touch point P input. In addition, at the beginning of Vy and Vx, there may be a spike (not shown) caused by the input electrical signals Signal_Ei1 and Signal_Ei2 being received by the second horizontal-axis transducer element 14b and the second vertical-axis transducer element 15b directly via the second horizontal-axis reflection unit 17b and the second vertical-axis reflection unit 16b immediately after input, respectively.

However, in large-size SAW touch panels, since the surface acoustic wave attenuates with the increase of the propagation distance and the number of reflections traversed, as shown in FIG. 1E, the size of the depression also reduces. Thus, it is possible that a touch further away from the horizontal-axis and vertical-axis transducer elements 14a and 15b is not detected because the size of the depression fails to exceed a threshold.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

An objective of the present invention is to address the problem that a weak SAW signal on a large-size SAW touch panel due to long propagation distance renders a touch too difficult to be distinguished. The present invention provides a segment of SAW multiple times to be propagated on a SAW touch panel, and provides partial output electrical signals based on different portions of each SAW to construct a complete output electrical signal. Each received SAW signal is amplified to different extends to overcome that the SAW signal becomes too weak due to long propagation distance.

Moreover, the present invention further detects a position based on each depression in the complete output electrical signal.

The objectives of the present invention are accomplished by the following technical scheme. A position detecting method proposed by the present invention, comprising: providing a SAW touch panel; providing multiple SAW segments to be propagated on the SAW touch panel; receiving the SAWs propagated on the SAW touch panel; and providing a segment of partial output electrical signal based on a different portion of each received SAW and combining all of the partial output electrical signals to form a complete output electrical signal.

The objectives of the present invention are further accomplished by the following technical schemes.

A starting signal of a latter partial output electrical signal is larger than that of an ending signal of a front partial output electrical signal in the complete output electrical signal.

A wave number of a latter SAW segment is larger than a wave number of a front SAW segment in the multiple SAW segments.

Each segment of partial output electrical signal is generated based on a gain, the gain of a latter partial output electrical signal being larger than the gain of a front partial output electrical signal.

Each segment of partial output electrical signal is within a predefined range.

The SAW touch panel is laid out with multiple segments of detecting areas, each segment of partial output electrical signal corresponding to a segment of detecting area.

The multiple detecting areas include multiple segments of detecting areas laid along a vertical axis of the SAW touch panel and multiple segments of detecting areas laid along a horizontal axis of the SAW touch panel.

Each segment of partial output electrical signal corresponds to a period of time, wherein the period of time is in reference to a starting time for receiving the segment of partial output electrical signal or a starting time for providing the segment of partial output electrical signal.

The multiple SAW segments include multiple SAW segments initially propagated along a vertical axis of the SAW touch panel and multiple SAW segments initially propagated along a horizontal axis of the SAW touch panel, and the received SAWs include multiple SAW segments received along the vertical axis of the SAW touch panel and multiple SAW segments received along the horizontal axis of the SAW touch panel.

The complete output electrical signal is in the form of saw-tooth waveform when the SAW touch panel is untouched.

The objectives of the present invention are accomplished by the following technical scheme. A position detecting device proposed by the present invention, comprising: a surface acoustic wave (SAW) touch panel including a reflector array distributed on four sides of the SAW touch panel and a sensing device, the sensing device including: a first vertical-axis transducer element and a first horizontal-axis transducer element for providing multiple SAW segments to be propagated on the SAW touch panel; a second vertical-axis transducer element and a second horizontal-axis transducer element for receiving the SAWs propagated on the SAW touch panel; and a control circuit for providing a segment of partial output electrical signal based on a different portion of each received SAW and combining all of the partial output electrical signals to form a complete output electrical signal.

A starting signal of a latter partial output electrical signal is larger than that of an ending signal of a front partial output electrical signal in the complete output electrical signal.

A wave number of a latter SAW segment is larger than a wave number of a front SAW segment in the multiple SAW segments.

Each segment of partial output electrical signal is generated based on a gain, the gain of a latter partial output electrical signal being larger than the gain of a front partial output electrical signal.

Each segment of partial output electrical signal is within a predefined range.

The SAW touch panel is laid out with multiple segments of detecting areas, each segment of partial output electrical signal corresponding to a segment of detecting area.

The multiple detecting areas include multiple segments of detecting areas laid along the vertical axis of the SAW touch panel and multiple segments of detecting areas laid along the horizontal axis of the SAW touch panel.

Each segment of partial output electrical signal corresponds to a period of time, wherein the period of time is in reference to a starting time for receiving the segment of partial output electrical signal or a starting time for providing the segment of partial output electrical signal.

The multiple SAW segments include multiple SAW segments initially propagated along the vertical axis of the SAW touch panel provided by the first vertical-axis transducer element and multiple SAW segments initially propagated along a horizontal axis of the SAW touch panel provided by the first horizontal-axis transducer element, and the received SAWs include multiple SAW segments received along the vertical axis of the SAW touch panel by the second vertical-axis transducer element and multiple SAW segments received along the horizontal axis of the SAW touch panel by the second horizontal-axis transducer element.

The complete output electrical signal is in the form of saw-tooth waveform when the SAW touch panel is untouched.

With the above technical schemes, the present invention has atH least the following advantages and effects:

1. As to the amplification of the received SAW signals, wave number can be increased to achieve this, and it is thus not limited to the gain performance of hardware circuits; and 2. As to the different degrees of amplifications given to different detecting areas, the signals can be adaptively maintained in a predefined range, so that the size of an applicable SAW touch panel can be significantly increased.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1A:
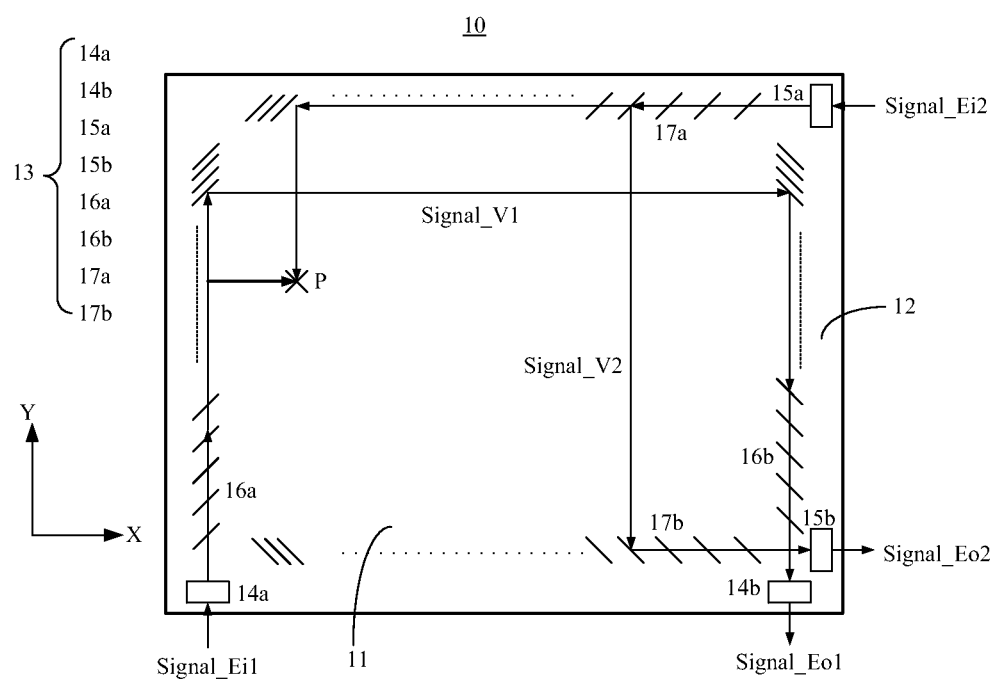
FIG. 1A is a schematic diagram depicting a prior-art SAW touch panel.
Figure 1B:
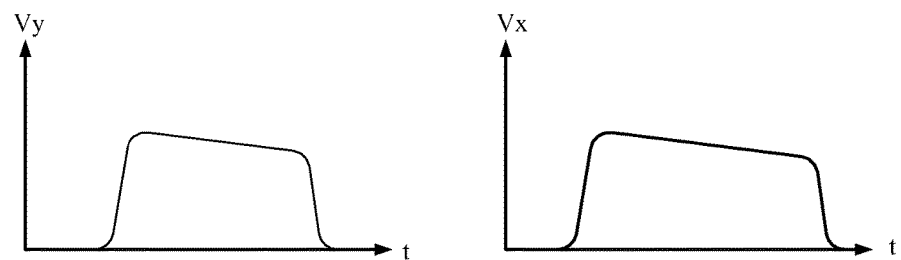
FIG. 1B is a diagram illustrating the electrical potential of output electrical signals when the prior-art SAW touch panel has no touch.
Figure 1C:
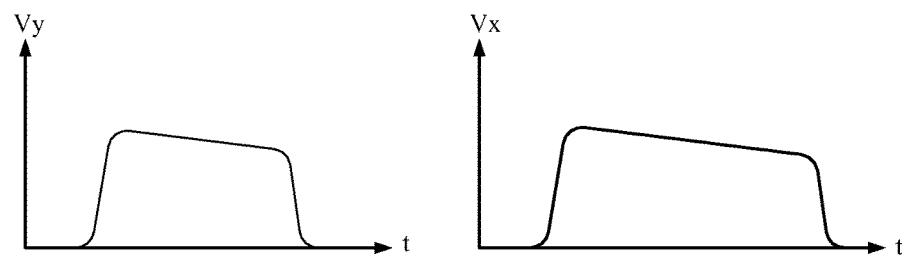
FIG. 1C is a diagram illustrating the electrical potential of output electrical signals when the prior-art SAW touch panel has a touch.
Figure 1D:
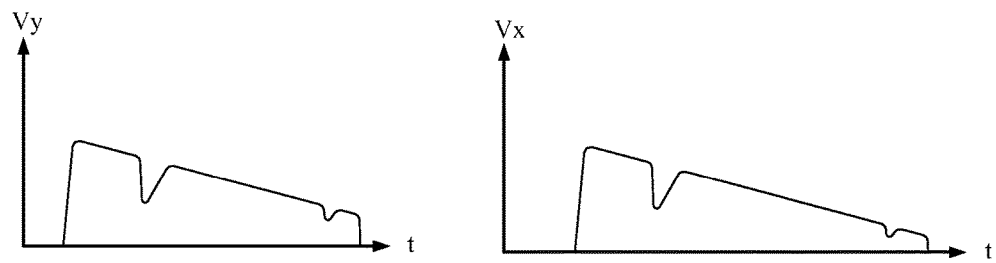
FIG. 1D is a diagram illustrating the electrical potential of output electrical signals when a large-size SAW touch panel has a touch.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

As shown in FIGS. 1E and 1F before, signals are presented by the signals received by the second horizontal-axis and vertical-axis transducer elements 14b and 15b after a string of continuous SAW is provided. The signals will gradually diminish, which affects the size of the depression corresponding to a touch.

Figure 2:
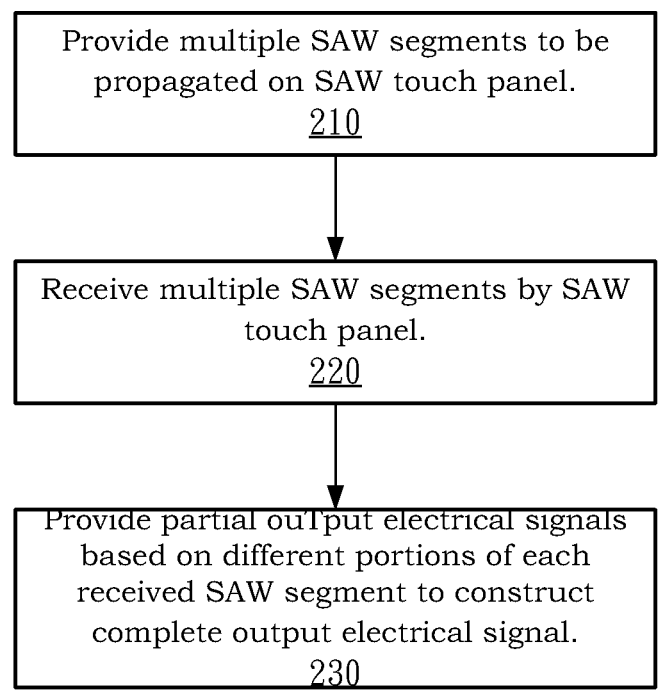
FIG. 2 is a flowchart illustrating a position detecting method according to a first embodiment of the present invention.

Referring now to FIG. 2, a position detecting method according to a first embodiment of the present invention is shown. First, in step 210, each time a detection is made, multiple SAW segments are provided on a SAW touch panel. Then, in step 220, the multiple SAW segments are received by the SAW touch panel. The multiple SAW segments may include multiple SAW segments initially propagated along the vertical axis of the SAW touch panel and multiple SAW segments initially propagated along the horizontal axis of the SAW touch panel. In addition, the received SAW segments may include multiple SAW segments received along the vertical axis of the SAW touch panel and multiple SAW segments received along the horizontal axis of the SAW touch panel. Then, in step 230, during or upon reception, a partial output electrical signal is provided for a different portion of each SAW segment, and a complete output electrical signal is constructed.

Referring again to FIG. 1, a position detecting device of the present invention includes a touch panel 10, which includes a screen area 11 and a reflection area 12. The reflection area 12 includes a sensing device 13, which has a first and a second horizontal-axis transducer element 14a and 14b and a first and a second vertical-axis transducer element 15a and 15b, wherein the second horizontal-axis and vertical axis transducer elements 14b and 15b receive SAW signals Signal_V1 and Signal_V2 corresponding to input electrical signals Signal_Ei1 and Signal_Ei2 sent by the first horizontal-axis and vertical axis transducer elements 14a and 15a, and produce output electrical signals Signal_Eo1 and Signal_Eo2, respectively. In addition, the sensing device 13 further includes a set of first and second vertical-axis reflection units 16a and 16b and a set of first and second horizontal-axis reflection units 17a and 17b. These four reflection units 16a, 16b, 17a and 17b each includes a plurality of reflectors r. These reflectors r are all partially transmissive and partially reflective. Meanwhile, the SAW signals Signal_V1 and Signal_V2 necessary for sensing a possible touch point P input on each horizontal axis and vertical axis are provided by this partially transmissive and partially reflective effect of the reflectors r. These reflectors r can be a wiring layer printed on a glass substrate of the touch screen, so cost of manufacturing is low. In addition, the reflectors r of the reflection units 16a, 16b, 17a and 17b are all arranged from sparse to dense (as seen from the traveling directions of the SAW signals Signal_V1 and Signal_V2).

The sending of the input electrical signals Signal_Ei1 and Signal_Ei2 and the reception of the output electrical signals Signal_Eo1 and Signal_Eo2 are carried out by a control circuit (not shown). This is a well-known technique to those with ordinary skill in the art, thus it will not further described. The control circuit performs the above position detecting method. The control circuit may include, for example, a processor and a storage unit. The storage unit carries a program that causes the processor to execute the above steps 210 to 230.

Figure 3:
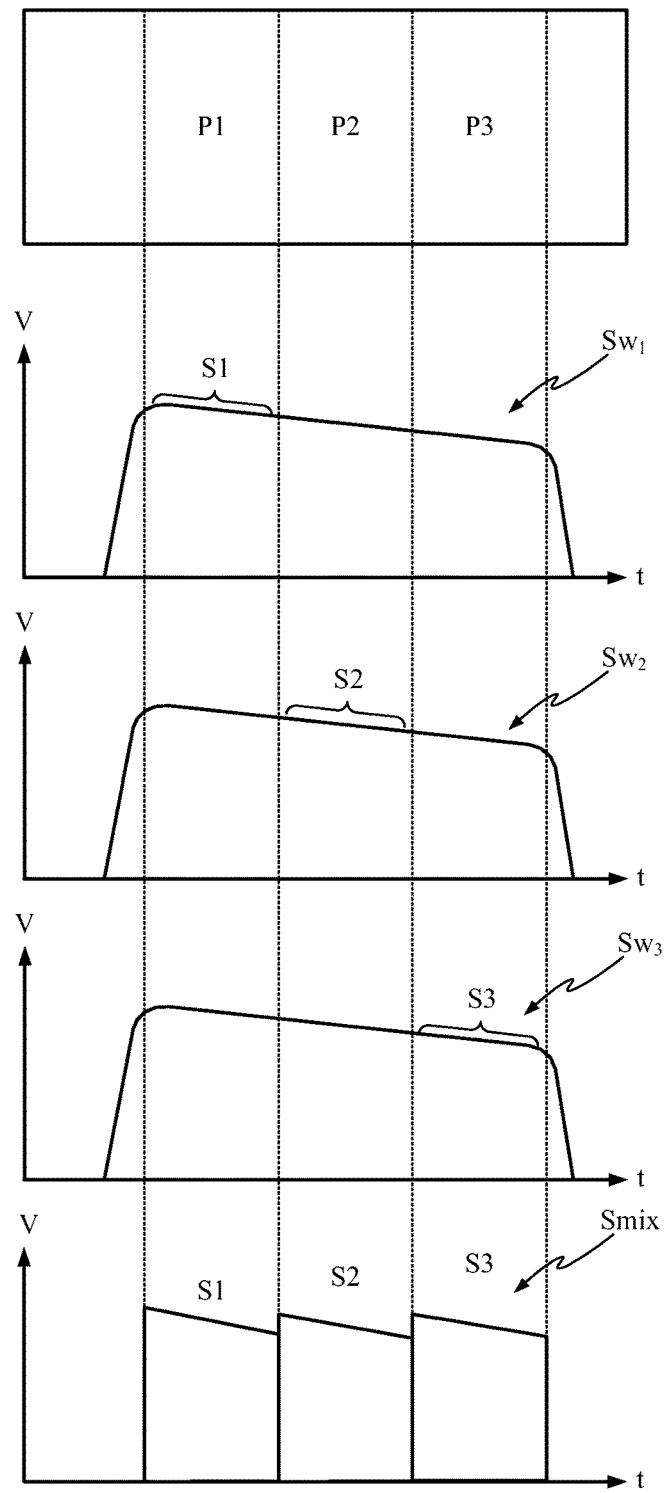
FIG. 3 is a schematic diagram illustrating signal extraction in the first embodiment of the present invention.

Referring to FIG. 3, in an example of the present invention, multiple segments of detection areas corresponding to the horizontal and vertical axes are laid out on the SAW panel. Each segment of detection area correspondingly receives a different segment of the SAW. The above multiple SAW segments may include multiple SAW segments initially propagated along the vertical axis of the SAW touch panel and multiple SAW segments initially propagated along the horizontal axis of the SAW touch panel. Take vertically propagated SAWs as an example, three detecting areas P1, P2 and P3 are laid out in the vertical direction of the SAW panel, and three SAW segments are propagated. Corresponding to these three SAW segments, SAWs W1, W2 and W3 are received, and output electrical signals Sw1, Sw2 and Sw3 are generated, wherein a partial output electrical signal S1 is generated based on a portion of the received SAW W1 corresponding to the detecting area P1; a partial output electrical signal S2 is generated based on a portion of the received SAW W2 corresponding to the detecting area P2; a partial output electrical signal S3 is generated based on a portion of the received SAW W3 corresponding to the detecting area P3, and these partial output electrical signals S1, S2 and S3 are combined to construct a complete output electrical signal Smix. Although the descriptions above are made in the context of the vertical axis, it is appreciated by one with ordinary skill in the art that the above descriptions are equally applicable to the horizontal axis. In addition, the output electrical signal Smix includes, but is not limited to, the partial output electrical signals S1, S2 and S3, as well as output electrical signals before the detecting area P1 and output electrical signals after the detecting area P3.

Although FIG. 3 shows three segments of partial output electrical signals, it is appreciated by one with ordinary skill in the art that the above partial output electrical signals and the propagated SAWs can have different number of segments, and the present invention is not limited to this. Furthermore, the extraction of each segment of partial output electrical signal may be based on a time region corresponding to different detecting areas, wherein the time region may be in reference to the initial time for receiving the SAW segment or the initial time for providing the SAW segment, that is, a period of time since the initial time for receiving the SAW segment or the initial time for providing the SAW segment. The period of time for each SAW is not necessarily the same.

In an example of the present invention, after the received SAWs W1, W2 and W3 are converted into the output electrical signals Sw1, Sw2 and Sw3, the partial output electrical signals S1, S2 and S3 are then extracted from the output electrical signals Sw1, Sw2 and Sw3 to construct the complete output electrical signal Smix.

In another example of the present invention, during reception, the portions of the received SAWs W1, W2 and W3 corresponding to the detecting areas P1, P2 and P3 are converted into the partial output electrical signals S1, S2 and S3, respectively.

Moreover, the present invention further includes amplifying the output electrical signal by increasing the wave number of the SAWs or raising the gain of converting the received SAWs to the output electrical signals, so that the extracted partial output electrical signals S1, S2 and S3 may be maintained in a predefined range.

In an example of the present invention, the output electrical signal is raised by increasing the wave number of the SAWs. Each propagated SAW segment can have a different wave number. For example, the wave number of the third SAW segment is larger than that of the second SAW segment, and the wave number of the second SAW segment is larger than that of the first SAW segment. In other words, the wave number of at least one later SAW segment is larger than that of at least one former SAW segment. Obviously, when the SAW touch panel is untouched, the above complete output electrical signal may be in the form of a partial or complete saw-tooth waveform. The region where the saw-tooth waveform is present at least corresponds to a region in which the SAW panel is able to detect a touch, or corresponding to a region in which the above horizontal-axis and vertical-axis transducer elements or reflectors is able to reflect the SAWs to traverse the SAW touch panel.

In another example of the present invention, the output electrical signal is raised by increasing the gain. A partial output electrical signal can be extracted from each received SAW using a different gain. In other words, each output electrical signal is generated by the sensing device based on a gain; the gain of at least one later SAW segment is larger than that of at least one former SAW segment, or the gain of at least one later partial output electrical signal is larger than that of at least one former partial output electrical signal.

In yet another example of the present invention, the output electrical signal is raised by increasing both wave number and the gain. Regardless of which method is used to raise the output electrical signal, the size of a depression caused by a touch can also be increased.

According to the above, the output electrical signal can be maintained in a predefined range when the SAW touch panel is untouched, and the size of a depression caused by a touch can also be increased to a detectable level, such as greater than a threshold.

In a second embodiment of the present invention, a single SAW segment can be propagated, and the received SAW is then converted into multiple segments of partial output electrical signals using multiple segments of different gains, and each segment of the partial output electrical signals is maintained at a similar range. However, in large-size SAW touch panel, the latter signals may attenuate to a range that is hard to detect, thus even if the gain is increased, it may still not be possible to detect a touch and a touch position from the partial output electrical signal.

In a third embodiment of the present invention, when a depression spans over multiple adjacent segments of partial output electrical signals, another SAW segment is propagated, and a segment of output electrical signal including the depression is generated based on the received SAW in order to accurately determine the touch position. For example, the centroid position is calculated based on the depression.

Figure 4:
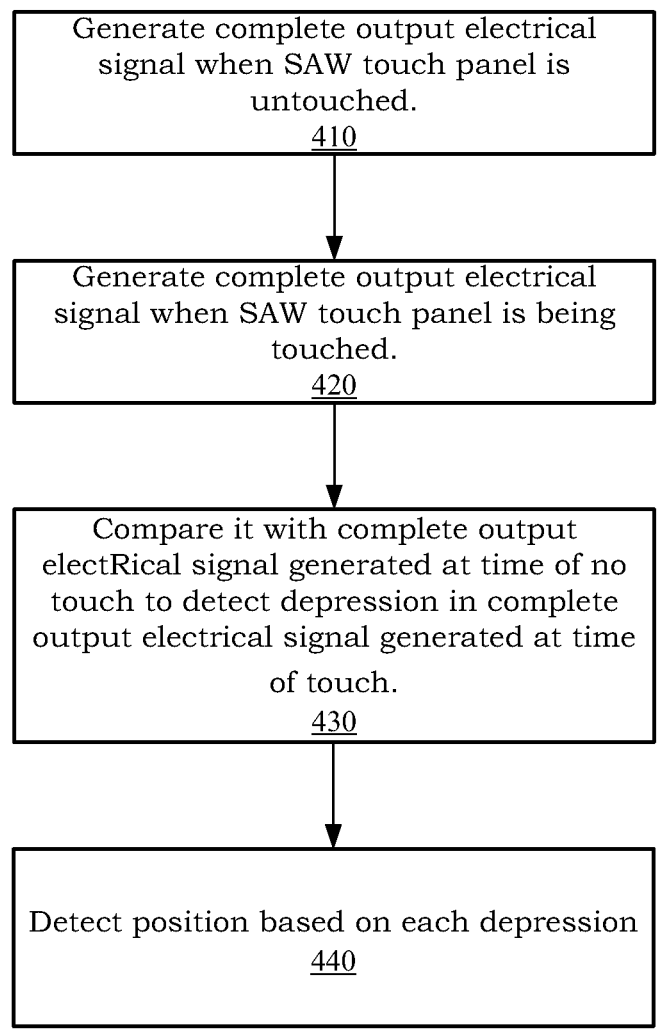
FIG. 4 is a flowchart illustrating a position detecting method according to a third embodiment of the present invention.

In summary of the above, the present invention provides a position detecting method as shown in FIG. 4. In step 410, a complete output electrical signal is generated when a SAW touch panel is untouched. The complete output electrical signal is formed by combining multiple segments of partial output electrical signals generated based on different parts of multiple SAWs. Then, in step 420, a complete output electrical signal is generated when the SAW touch panel is being touched. Thereafter, in step 430, this signal is compared with the complete output electrical signal generated at the time of no touch to detect any depression in the complete output electrical signal generated at the time of touch, wherein the size of each depression is greater than a threshold. Then, in step 440, a position is detected based on each depression. Furthermore, the above steps 410 to 440 can be carried out by the control circuit.

Figure 5A:
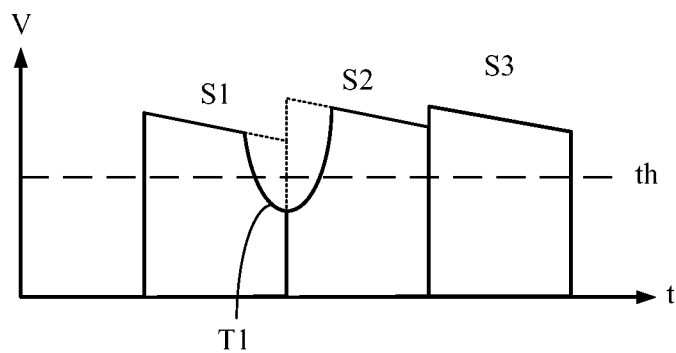
FIGS. 5A and 5B are schematic diagrams illustrating a touch position that spans over multiple segments of output electrical signals provided by a second embodiment of the present invention.
Figure 5B:
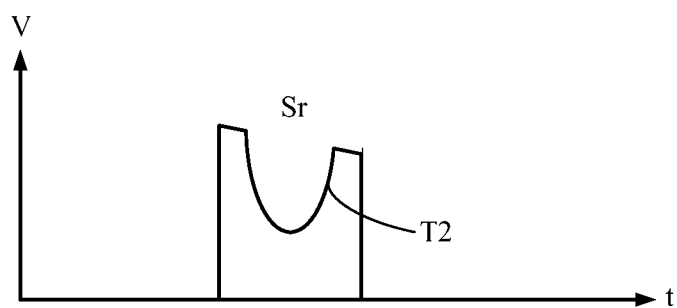

Referring to FIG. 5A, a depression T1 corresponding to a touch spans over two partial output electrical signals S1 and S2 is shown. If the centroid position is calculated based on this depression, since the size of depression is greater on the partial output electrical signal S2, so the centroid position will skew towards the partial output electrical signal S2. Thus, as shown in FIG. 5B, after determining that the size of the depression T1 is greater than the threshold, a SAW with a corresponding wave number corresponding to the range of the depression T1 is propagated on the SAW touch panel, thus generating a partial output electrical signal Sr including a depression T2 that corresponds to the same touch. Since the output electrical signal is generated based on the same SAW segment, so the determined centroid position more accurately represents the touch position.

In other words, the above steps 410 to 430 may be regarded as a first detecting stage, and upon detecting a depression spanning over multiple partial output electrical signals, a second detecting stage is performed to detect the position represented by this depression spanning over multiple partial output electrical signals.

The second detecting stage generates a second-stage SAW segment based on each first-stage depression spanning over multiple partial output electrical signals, and generates a second-stage output electrical signal based on the received SAW. The second-stage output electrical signal is not in the form of saw-tooth waveform. Assuming the depressions detected in step 430 are first-stage depressions, each second-stage output electrical signal corresponds to a first-stage depression spanning over multiple partial output electrical signals, and a second-stage depression is presented at a corresponding first-stage depression. The above position is detected based on the second-stage depression, that is, the above position is detected based on a portion of the second-stage output electrical signal that corresponds to the above first-stage depression.

The wave number of the second-stage SAW can be generated based on the corresponding first-stage depression spanning over multiple partial output electrical signals, for example, based on the wave number of the SAW corresponding to the first partial output electrical signal over which the first-stage depression spanned, or based on the wave number of the SAW corresponding to the last partial output electrical signal over which the first-stage depression spanned, or based on an average of the above two.

The gain of the second-stage SAW can be generated based on the corresponding first-stage depression spanning over multiple partial output electrical signals, for example, based on the gain corresponding to the first partial output electrical signal over which the first-stage depression spanned, or based on the gain corresponding to the last partial output electrical signal over which the first-stage depression spanned, or based on an average of the above two.

Figure 5C:
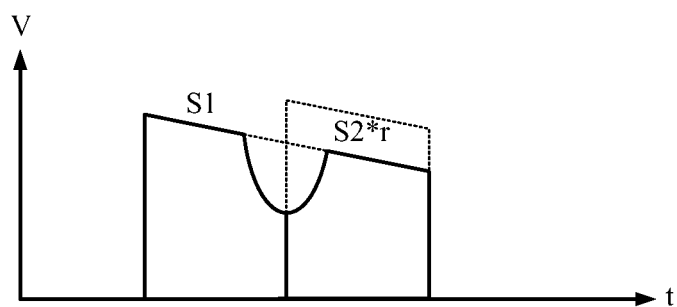
FIG. 5C is a schematic diagram illustrating a touch position that spans over multiple segments of output electrical signals provided by a third embodiment of the present invention.

In a fourth embodiment of the present invention, when a depression spanning over multiple partial output electrical signals corresponding to a touch is detected, then at least one of the latter or front partial output electrical signals in the depression range is adjusted (shrunk or enlarged), simulating a continuous detection waveform for detecting the touch position. For example, as shown in FIG. 5C, based on the ratio r of the ending signal of the front partial output electrical signal to the starting signal of the latter partial output electrical signal, the whole latter partial output electrical signal is shrunk. In an example of the present invention, when the front partial output electrical signal is already shrunken, the overall latter output electrical signal is shrunk by a ratio of the ending signal of the already shrunken front partial output electrical signal to the starting signal of the latter partial output electrical signal. It can be appreciated by one with ordinary skill in the art that the whole front output electrical signal can be enlarged based on the ratio r of the starting signal of the latter partial output electrical signal to the ending signal of the front partial output electrical signal. Alternatively, the front and latter output electrical signals can both be adjusted based on the ratio r.

In other words, in the above step 440, at least one of partial output electrical signals corresponding to a depression spanning over those partial output electrical signals is enlarged or shrunk before position detection is performed.

For example, in the case that the starting signal of a latter partial output electrical signal is larger than the ending signal of the front partial output electrical signal in a complete output electrical signal, the partial output electrical signal to be enlarged is enlarged by a ratio of a starting signal of a latter partial output electrical signal following a partial output electrical signal corresponding to the partial output electrical signal to be enlarged in the complete output electrical signal when the SAW is untouched to an ending signal of the partial output electrical signal corresponding to the partial output electrical signal to be enlarged. Alternatively, the partial output electrical signal to be shrunk is shrunk by a ratio of an ending signal of a front partial output electrical signal preceding a partial output electrical signal corresponding to the partial output electrical signal to be shrunk in the complete output electrical signal when the SAW is untouched to a starting signal of the partial output electrical signal corresponding to the partial output electrical signal to be shrunk.

In the present invention, the touch position is determined based on the centroid position as an example, but one with ordinary skill in the art can appreciate that there are other methods of calculating the touch position. However, these are not the focus of the present invention, and thus will not be further described herein.

Moreover, the detection of a depression can be made by comparing the complete output electrical signals at the time of no touch and at the time of touch, or alternatively, by directly detecting on the complete output electrical signal at the time of touch; the present invention does not put limit on this.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A position detecting method, comprising:
   providing a first surface acoustic wave (SAW) to a plurality of reflectors of a SAW touch panel, wherein each pair of the plurality of reflectors partially reflect the first SAW to output a first partially reflected SAW;
   receiving all of the first partially reflected SAWs to form a first output electrical signal;
   select a first portion of the first output electrical signal;
   providing a second surface acoustic wave to the plurality of reflectors, wherein each pair of the plurality of reflectors partially reflect the second SAW to output a second partially reflected SAW;
   receiving all of the second partially reflected SAWs to form a second output electrical signal;
   select a second portion of the second output electrical signal; and
   forming a complete output electrical signal including the first portion of the first output electrical signal and the second portion of the second output electrical signal.

2. The method of claim 1, wherein a wave number of the second portion is larger than a wave number of the first portion.

3. The method of claim 1, further comprising:
   providing a third surface acoustic wave to the plurality of reflectors, wherein each pair of the plurality of reflectors partially reflect the second SAW to output a third partially reflected SAW;
   receiving all of the third partially reflected SAWs to form a third output electrical signal;
   select a third portion of the third output electrical signal, wherein the complete output electrical signal including further comprises the third portion, wherein the first portion, the second portion and the third portion are within a predefined range.

4. The method of claim 3, wherein the SAW touch panel is laid out with multiple segments of detecting areas, each of the first portion, the second portion and the third portion corresponding to a segment of detecting area.

5. The method of claim 4, wherein the multiple detecting areas include multiple segments of detecting areas laid along a vertical axis of the SAW touch panel and multiple segments of detecting areas laid along a horizontal axis of the SAW touch panel.

6. The method of claim 1, wherein the complete output electrical signal is in the form of saw-tooth waveform when the SAW touch panel is untouched.

7. A position detecting device, comprising:
   a surface acoustic wave (SAW) touch panel including a plurality of reflectors
      a control circuit for providing a first surface acoustic wave (SAW) to the plurality of reflectors, wherein each pair of the plurality of reflectors partially reflect the first SAW to output a first partially reflected SAW; receiving all of the first partially reflected SAWs to form a first output electrical signal; select a first portion of the first output electrical signal; providing a second surface acoustic wave to the plurality of reflectors, wherein each pair of the plurality of reflectors partially reflect the second SAW to output a second partially reflected SAW; receiving all of the second partially reflected SAWs to form a second output electrical signal; select a second portion of the second output electrical signal; and forming a complete output electrical signal including the first portion of the first output electrical signal and the second portion of the second output electrical signal.

8. The device of claim 7, wherein a wave number of the second portion is larger than a wave number of the first portion.

9. The device of claim 7, wherein the control circuit further performs the steps:
   providing a third surface acoustic wave to the plurality of reflectors, wherein each pair of the plurality of reflectors partially reflect the second SAW to output a third partially reflected SAW;
   receiving all of the third partially reflected SAWs to form a third output electrical signal;

select a third portion of the third output electrical signal, wherein the complete output electrical signal including further comprises the third portion, the first portion, the second portion and the third portion are within a predefined range.

10. The device of claim 9, wherein the SAW touch panel is laid out with multiple segments of detecting areas, each of the first portion, the second portion and the third portion corresponding to a segment of detecting area.

11. The device of claim 10, wherein the multiple detecting areas include multiple segments of detecting areas laid along the vertical axis of the SAW touch panel and multiple segments of detecting areas laid along the horizontal axis of the SAW touch panel.

12. The device of claim 7, wherein the complete output electrical signal is in the form of saw-tooth waveform when the SAW touch panel is untouched.

13. A control circuit, coupling to a sensing device of a surface acoustic wave (SAW) touch panel, which including a plurality of reflectors, performing the steps:
provoking a first surface acoustic wave (SAW) to the plurality of reflectors, wherein each pair of the plurality of reflectors partially reflect the first SAW to output a first partially reflected SAW;
receiving all of the first partially reflected SAWs to form a first output electrical signal;
select a first portion of the first output electrical signal;
providing a second surface acoustic wave to the plurality of reflectors, wherein each pair of the plurality of reflectors partially reflect the second SAW to output a second partially reflected SAW;
receiving all of the second partially reflected SAWs to form a second output electrical signal;
select a second portion of the second output electrical signal; and
forming a complete output electrical signal including the first portion of the first output electrical signal and the second portion of the second output electrical signal.

14. The control circuit of claim 13, wherein a wave number of the second portion is larger than a wave number of the first portion.

15. The control circuit of claim 13, further performing:
providing a third surface acoustic wave to the plurality of reflectors, wherein each pair of the plurality of reflectors partially reflect the second SAW to output a third partially reflected SAW;
receiving all of the third partially reflected SAWs to form a third output electrical signal;
select a third portion of the third output electrical signal, wherein the complete output electrical signal including further comprises the third portion, wherein the first portion, the second portion and the third portion are within a predefined range.

16. The control circuit of claim 15, wherein the SAW touch panel is laid out with multiple segments of detecting areas, each of the first portion, the second portion and the third portion corresponding to a segment of detecting area, wherein the multiple detecting areas include multiple segments of detecting areas laid along a vertical axis of the SAW touch panel and multiple segments of detecting areas laid along a horizontal axis of the SAW touch panel.

17. The control circuit of claim 13, wherein the complete output electrical signal is in the form of saw-tooth waveform when the SAW touch panel is untouched.

* * * * *